United States Patent [19]
De Groat et al.

[11] 4,031,727
[45] June 28, 1977

[54] KING PIN LOCK

[76] Inventors: Philip M. De Groat, 823 Pine St., Endicott, N.Y. 13760; Robert A. Lewis, R.D. No. 1, Box 70, Port Crane, N.Y. 13833

[22] Filed: May 12, 1976

[21] Appl. No.: 685,643

[52] U.S. Cl. .................................. 70/232; 70/167
[51] Int. Cl.² ................... E05B 65/12; B60R 25/00
[58] Field of Search ............ 70/34, 166, 167, 169, 70/229, 231, 232, 258, 259, 25, 26, DIG. 58, DIG. 26

[56] References Cited
UNITED STATES PATENTS

| | | | |
|---|---|---|---|
| 1,702,205 | 2/1929 | Freedman | 70/231 X |
| 1,796,517 | 3/1931 | Ganz | 70/232 X |
| 1,912,872 | 6/1933 | Trautner | 70/232 X |
| 2,630,699 | 3/1953 | Langdon | 70/232 |
| 2,755,655 | 7/1956 | Maffey | 70/232 |
| 3,415,085 | 12/1968 | Eble | 70/232 |
| 3,426,561 | 2/1969 | Kinait | 70/259 |
| 3,600,914 | 8/1971 | Johnson | 70/232 |
| 3,696,646 | 10/1972 | Loscalzo | 70/232 X |
| 3,832,872 | 9/1974 | Gerlach | 70/232 |
| 3,922,897 | 12/1975 | Mickelson | 70/232 |

*Primary Examiner*—J. Franklin Foss
*Attorney, Agent, or Firm*—George E. Clark

[57] ABSTRACT

A locking mechanism prevents a conventional interlocking towing connection between a tractor and trailer, the locking mechanism includes a main body of forged steel, a king pin chamber and a secondary chamber opening into and situated at an angle with respect to the king pin chamber, a rotating lock bar mounted in the secondary chamber and having an end portion which may be rotated into a position adjacent to the reduced diameter portion of the king pin to prevent removal of the main body housing from the king pin, an increased diameter of the lock bar situating it within the main body housing thereby preventing the lock bar from being physically moved along its longitudinal axis in spite of the removal of a shouldered lock mechanism, the only means of removing the king pin lock being a 180° rotation of the lock bar.

7 Claims, 4 Drawing Figures

KING PIN LOCK

BACKGROUND OF THE INVENTION

1. Field of the Invention

This invention relates to locks and more specifically to locking mechanisms mountable on the king pins of semitrailers.

Semitrailers full of cargo are frequently stolen by dishonest parties because the semitrailers must often be left unattended for several hours or are located in an area where it would not seem unusual for a tractor to connect to and depart with a semitrailer. The present invention was made in order to severely deter such semitrailer theft by providing an effective portable locking mechanism which attaches to the semitrailer king pin and which is of a convenient size and weight.

2. Description of Prior Art

In the prior art, there are several locking devices, all of which employ movement of a lock bar against the recessed portion of a king pin such that the motion of the lock bar is at a right angle to the king pin. In addition, to prevent removal of the lock bar in the event the key lock mechanism itself is removed, various devices have been proposed which are built into the main body and which must themselves move and which are therefore subject to being adversely affected by dirt, grease, and other foreign matter common to the environment in which the lock is used. These additional moving parts also make the locks more difficult and expensive to manufacture. In addition, these moving parts must be periodically dismantled and cleaned to insure continued proper performance.

The present invention provides a secure lock which is unique in its orientation of the lock bar with respect to the king pin and which is also unique in the operation of the lock bar itself. The lock bar cannot move along its longitudinal axis and cannot therefore be removed even if the cylinder lock mechanism is removed. Except for the cylinder lock mechanism, the lock bar is the only portion of the lock which moves. The lock bar motion is purely rotational and is therefore less subject to the jamming effects of dirt and other debris common to its environment. It is also unique in that the only way to remove the lock is to rotate the lock bar a full 180°. Rotation of the lock bar through an angle less than 180° will allow the lock bar to maintain a locking effect on the king pin.

SUMMARY OF THE INVENTION

It is an object of the present invention to provide a king pin lock with a lock bar uniquely oriented at an acute angle with respect to the king pin thereby allowing the lock bar to function effectively exclusively by means of rotation about its longitudinal axis.

It is a further object of the present invention to provide a lock bar with a unique configuration such that the diameter of the principal portion of the lock bar situated within the main body is greater than that portion of the lock bar which is adjacent to the cylinder lock mechanism. This has the further advantage of preventing removal of the lock bar in the event the cylinder lock mechanism is removed.

It is a still further object of the present invention to provide a lock bar with a facing surface angle such that a rotation on 180° of the lock bar in one direction will cause the facing surface to be flush with the side of the king pin chamber and a 180° rotation in the opposite direction will cause the lock bar to be positioned adjacent to the reduced diameter portion of the king pin resulting in a locking effect.

It is another object of the present invention to provide a lock bar which must be rotated a full 180° to be in the unlocked position. Any rotation of a fewer number of degrees will allow the lock bar to retain a locking effect thereby preventing removal of the king pin lock by means of a parital rotation of the lock bar.

It is yet another object of the present invention to provide a main body of forged steel thereby retarding removal by means of a hacksaw or other metal cutting device.

It is a still further object of the present invention to provide a locking mechanism requiring a circular tumbler key thereby offering a lock difficult to pick or open illicitly through any conventional method.

A locking apparatus for engaging a semitrailer king pin includes a housing having a king pin receiving chamber and a secondary chamber opening to the king pin chamber, a lock bar permanently mounted in the secondary chamber and operating by means of rotation about its longitudinal axis. Proper operation is effected by means of the angle of the secondary chamber with respect to the king pin together with the angle of the surface of the lock bar thereby allowing a position of the lock bar flush with the wall of the king pin receiving chamber when unlocked and a position adjacent to the reduced diameter of the king pin when in the locked position.

These and other objects, features, and advantages of the present invention together with the operation of the invention will be understood by reference to the following detailed description taken together with the following drawing.

DETAILED DESCRIPTION OF THE INVENTION

Figure 1:
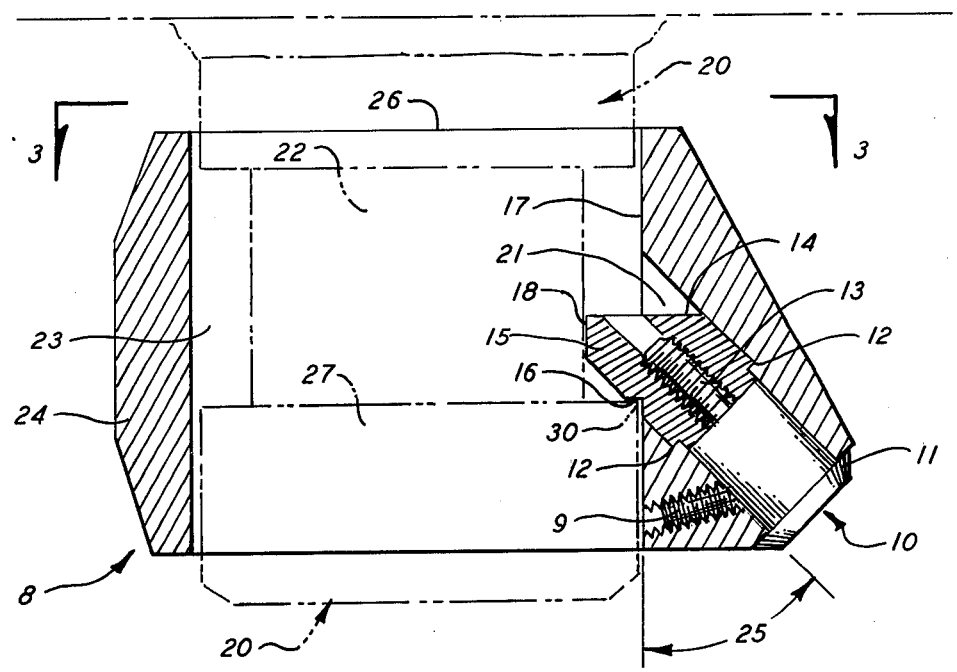
FIG. 1 is a lateral transverse cross-sectional view of a king pin lock showing an embodiment of the present invention such that the lock bar is in a locked position.

Referring specifically to FIG. 1, the king pin lock 8 is shown in the fully locked position attached to a king pin 20. The cylindrical key lock mechanism 10 is shouldered 11 to overlap the forged steel main body 24. The cylindrical key lock mechanism 10 is held in place by a set screw 9 which is inaccessible when the king pin 20 is contained within the king pin chamber 23. The lock bar 15 is attached to the cylindrical key lock mechanism 10 by means of a set screw 13 which is also inaccessible when the king pin 20 is situated in the king pin chamber 23. The angle 25 of the lock bar 15 with respect to the king pin chamber 23 is 45°. The surface face 14 of the lock bar 15 is cut so as to be parallel with the top of the king pin lock upper surface 26. The leading edge 18 of the lock bar 15 is cut parallel to and in such a manner as to be adjacent to the reduced diameter portion 22 of the king pin 20. The diameter of the lock bar 15 increases at a point 12 beyond the point of contact between the lock bar 15 and the cylindrical lock mechanism 10, thus preventing any motion of the lock bar 15 toward the cylindrical lock mechansim 10. This configuration eliminates the need of any other part to hold the lock bar 15 in place within the main body 24. The lock bar 15 is grooved 16 to accommodate the corner 30 of the lower portion 27 of the king pin 20.

Figure 2:
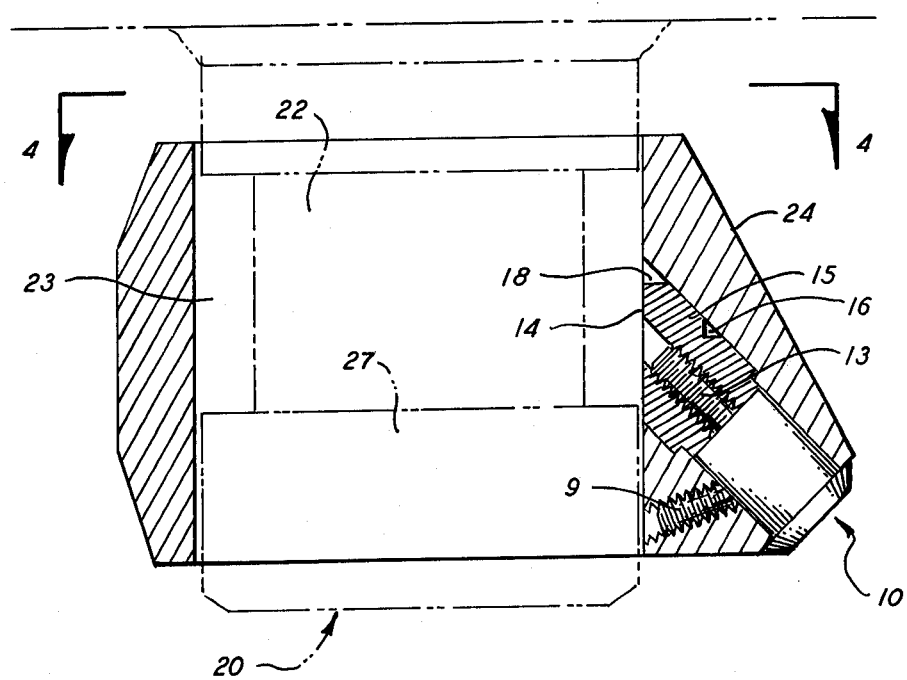
FIG. 2 is a view of the embodiment of the present invention of the king pin lock having the lock bar in the unlocked position.

Referring specifically to FIG. 1 and FIG. 2, the unique orientation of the secondary chamber 21 at a 45° angle 25 with respect to the king pin chamber 23 allows the lock bar 15 to rotate 180° thereby causing the surface face 14 (see FIG. 1) of the lock bar 15 to be reoriented so that it becomes parallel to and flush with the wall of the king pin chamber 23 (see FIG. 2). It is evident that no motion of the lock bar 15 has taken place along its longitudinal axis and that the only motion which has taken place has been that of rotation of the lock bar 15 about its longitudinal axis, which motion is effected by turning a key inserted into the cylindrical lock mechanism 10. It is also evident that should the cylindrical lock mechanism 10 be removed in an attempt to remove the king pin lock 8, the inability of the lock bar 15 to move along its longitudinal axis will allow the king pin lock 8 to remain in a locked position (see FIG. 1), thereby hindering the surreptitious removal of the king pin lock 8.

Figure 3:
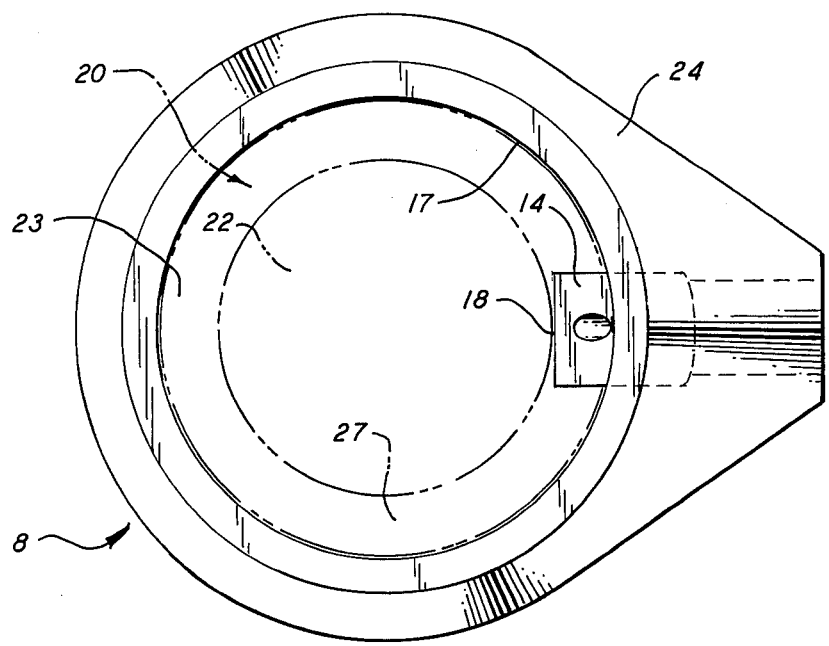
FIG. 3 is an end view of the king pin lock according to the present invention with the lock bar in the locked position.
Figure 4:
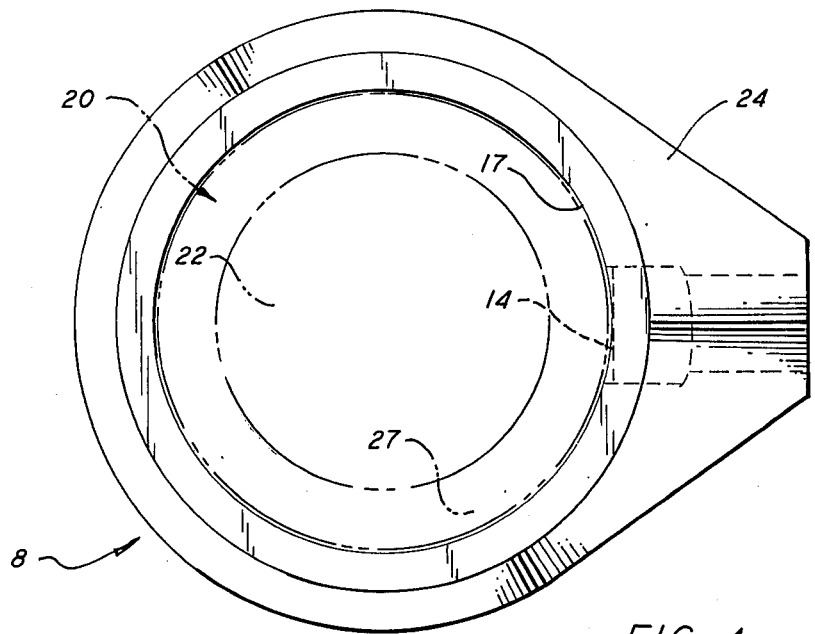
FIG. 4 is an end view of the king pin lock according to the present invention with the lock bar in the unlocked position.

Referring now to FIGS. 3 and 4, the action of the lock bar is more readily apparent. Leading edge 18 of lock bar 15 protrudes into king pin chamber 23 when lock bar 15 is in the locked position. This prevents king pin lock 8 from being removed from king pin 20. Lock bar 15 contacts the lower portion 27 of king pin 20 and prevents the axial movement of the king pin lock 8 along king pin 20.

However, when the lock is in the unlocked position as shown in FIG. 4, surface face 14 of lock bar 15 is aligned with the inner edge 17 of the body 24 of king pin lock 8 so that king pin lock 8 may be moved axially along and off king pin 20.

While the present invention has been described with reference to preferred embodiments thereof, it is understood by those skilled in the art that various changes in form and application of the king pin lock may be made without departing from the spirit or scope of the invention.

What is claimed is:

1. A locking mechanism, comprising;
   a housing, for surrounding a device to be protected by said locking mechanism, said housing being freely rotatable about said device whether said locking mechanism is in the locked or unlocked condition;
   a lock bar mounted at an acute angle within said housing;
   said lock bar having a bearing surface said bearing surface being cut at a second angle to prevent removal of said locking mechanism in the locked condition and to allow removal of said locking mechanism in the unlocked condition; and
   a key lock mechanism for rotating said lock bar to the locked or unlocked condition.

2. A locking mechanism according to claim 1 wherein said lock bar comprises:
   a first area havng a first cross section; and
   a second area having a second cross section, said second cross section being greater than said first cross section to prevent movement of said lock bar along a longitudinal axis within said housing.

3. A locking mechanism according to claim 1 wherein said lock bar is moved from a locked position to an unlocked position by rotation through 180° of said lock bar.

4. A locking mechanism according to claim 1 wherein said acute angle is between 30° and 60°.

5. A locking mechanism according to claim 1 wherein said key lock mechanism comprises a circular tumbler key lock mechanism to inhibit unauthorized unlocking.

6. A locking mechanism according to claim 1 wherein said lock bar further comprises a notch for bearing against a surface of the object to which said locking mechanism is attached to enhance the locking action of said lock bar.

7. A locking mechanism according to claim 1 for locking a king pin mounted on a semi-trailer comprising:
   a hardened steel housing;
   a lock bar mounted at a 45° angle within said housing, said lock bar having a notch cut in a surface thereof for bearing against a surface of a king pin to which said locking mechanism is attached; and
   a cylindrical tumbler key lock mechanism for rotating said lock bar between a locked and an unlocked position.

* * * * *